United States Patent

[11] 3,591,788

[72] Inventor Gunnar Brodin
Bergvagen 14, Saltsjo-Duvnas, Sweden
[21] Appl. No. 670,978
[22] Filed Sept. 27, 1967
[45] Patented July 6, 1971

[54] APPARATUS FOR DETERMINING THE CORRELATION BETWEEN TWO ELECTRICAL SIGNALS
9 Claims, 7 Drawing Figs.
[52] U.S. Cl. .................................................. 235/181,
235/183, 235/194, 179/100.2
[51] Int. Cl. ....................................................... G06g 7/19
[50] Field of Search............................................. 235/181,
194; 179/100.2 CH

[56] References Cited
UNITED STATES PATENTS

| | | | |
|---|---|---|---|
| 3,114,009 | 12/1963 | Camras et al. ................ | 179/100.2 |
| 3,459,928 | 8/1969 | Lerwill et al. ................ | 235/181 |
| 2,854,191 | 9/1958 | Raisbeck ....................... | 235/181 |
| 3,121,788 | 2/1964 | Hilbinger...................... | 235/194 |
| 3,174,142 | 3/1965 | Mallinckrodt................ | 235/181 |
| 3,404,265 | 11/1968 | Vallese et al. ................ | 235/194 |

FOREIGN PATENTS

| | | | |
|---|---|---|---|
| 1,134,529 | 8/1962 | Germany...................... | 179/100.2 |

OTHER REFERENCES

Billings et al. "A Correlator Employing Hall-Multipliers." PROC. IEE Vol. 107 Part B. (pages 435— 438) September 1960.

*Primary Examiner*—Malcolm A. Morrison
*Assistant Examiner*—Felix D. Gruber
*Attorney*—Charles F. Steininger ABSTRACT: Apparatus for obtaining ordinates on a correlation function of two electrical signals, including, a ferromagnetic recording medium and an electromagnetic pickup head movable relative to one another, the ferromagnetic recording medium having recorded thereon a first of the two signals and the magnetic pickup head having included in its magnetic circuit a Hall element; a control current supply means for passing a control current through the Hall element at right angles to the magnetic field in the pickup head and proportional to the second of the two signals, including, a magnetic recording head associated with the recording medium to record the second signal a predetermined period of time ahead of the detection of the first signal by the pickup head or a second magnetic pickup head, adapted to detect the second signal from a parallel track on the recording medium, having a second Hall element in its magnetic field, a constant current input means for passing a current through the second Hall element perpendicular to the magnetic field through the second Hall element, an output connected to the Hall element to receive an output voltage from the second Hall element orthogonally with respect to the second pickup head's magnetic field and the constant current and a transducer for converting the output of the said second Hall element to a proportional current and feeding such current to the input of the first Hall element; a first Hall element output means to receive a voltage from the first Hall element orthogonally to the magnetic field through the first Hall element and the control current to the first Hall element; and an integrator system connected to the first Hall element output, such as a low-pass filter or an operational amplifier and a control circuit for resetting the amplifier output to zero and varying the integration period, for integrating such output and displaying the output of the integrator as an indication or a recordation. The time delay interval may be varied by varying the relative speed between the recording medium and a pickup head, two pickup heads, or a pickup and a recording head, as the case may be, or by varying the distance between a pickup head and a recording head or two pickup heads, respectively.

INTEGRATOR

RECORDING UNIT

APPARATUS FOR DETERMINING THE CORRELATION BETWEEN TWO ELECTRICAL SIGNALS

FIELD OF THE INVENTION

The present invention relates to apparatus for determining the correlation between two electrical signals.

DESCRIPTION OF THE PRIOR ART

A number of electronic analog correlators are commercially available and have been described in the literature. Such correlators are intended mainly for carrying out measurements in laboratory environments, whereas installation thereof in small vehicles or craft, where correlation measurements may be expected to render very valuable information, has not, to our knowledge, been practiced to any substantial extent.

A correlator is required to be able to carry out three operations, viz delaying signal for a predetermined period, multiplying the delayed signal by a nondelayed signal and integrating the product over a predetermined period.

For example, in experimentally determining the cross-correlation function of two analog signals $x(t)$ and $y((t)$:

$$\Phi xy(\tau) = \lim_{T \to \infty} \frac{1}{2T} \int_{-T}^{T} x(t) \cdot y(t-\tau) dt \quad (1)$$

the limit transition $T \to \infty$, of course, cannot be realized technically. Thus, it will be necessary to form an approximate value:

$$\Phi xy(\tau) = \frac{1}{T} \int_{0}^{T} x(t) \cdot y(t-\tau) dt \quad (2)$$

over a finite time interval $T$. The error thus introduced will depend on the characteristics of the signals and the length of the time interval ($T$), and can be estimated by means of well-developed calculating methods.

For the autocorrelation function, there is quite analogously formed the expression:

$$\Phi'_{xx}(\tau) = \frac{1}{T} \int_{0}^{T} x(t) \cdot x(t-\tau) dt \quad (3)$$

From equations (2) and (3) it is seen that a correlator must be able to execute the following operations:
1. Delaying a signal during a period $\tau$.
2. Multiplying the delayed signal $Y(t-\tau)$ or $x(t-\tau)$, respectively, by a nondelayed signal $x(t)$.
3. Integration of the product $x(t) \cdot y(t-\tau)$ or $x(t) \cdot x(t-\tau)$ respectively, over the time internal $o-T$.

The delaying operation is often carried out by magnetic tape recording technique. The signal to be delayed is thereby recorded on tape and afterwards reproduced by a playback head, the time delay being varied either by changing the tape velocity $v$ or the distance L between the heads (if one of the heads is movable along the tape).

In order to reproduce slowly varying signals with conventional induction playback heads the recording and reproduction in prior correlators is based on carrier frequency principles, which implies that the instrument must include a carrier-frequency oscillator, modulators, demodulators and filters. This is necessary because induction heads generate an output signal proportional to the time derivative of the tape field strength dH/dt.

The multiplying operation, according to point 2 above, is carried out according to the prior art, by either analog computing techniques or pulse repetition-frequency methods. Both such methods require a large amount of equipment components.

Time averaging, according to point 3 above, is generally carried out by means of an operational amplifier connected as an integrator and adapted to be triggered on and off manually or automatically. The integration is started at the beginning of the analysis interval $T$ and stopped at the end of the interval. When analyzing rapid-rate events, the averaging can be done by means of a simple low-pass filter.

According to eq. (3) calculation of $\Phi_{xx}'(\tau)$ can be carried out with a closed loop magnetic tape, adapted to move at a velocity $v$ and having a fixed head adapted to record a signal $x(t)$ and play back this signal, and a movable head, spaced a predetermined distance therefrom adapted to play back the recorded signal after a time delay interval to produce the signal $x(t-\tau)$, mounted adjacent the tape; a step motor for displacing the movable head at predetermined intervals as dictated by a control unit; a multiplier, adapted to receive the playback signals from both heads; an integrator, adapted to receive the product signal from the multiplier; a recorder, adapted to record the integrator output; and a detector, such as a photodetector, which detects a light beam through holes in each turn of the tape loop, to thereby start and stop the step motor, the integrator, and the recorder by means of the control unit (For example, see pp. 96 to 98 of Section 5, "Computer Handbook," Husky and Korn, McGraw-Hill 1962.) A representative time portion $[x(t_1) \to x(t_1+T)]$ of the signal is recorded on the magnetic tape. With a preset $\tau$-value ($\tau_1 = L_1/v$) the recorded signal portion is reproduced, whereby the two heads yield signals proportional to $x(t)$ and $x(t-\tau_1)$ respectively. The signals are fed to the multiplier, and the product signal $x(t) x(t-\tau_1)$ is integrated over the interval $T$. At the end of the analysis interval the integrator output voltage is proportional to $\Phi_{xx}'(\tau_1)$. When this value has been recorded, the integrator output is zeroed and the movable head is displaced to a new position corresponding to a new time delay $\tau_2 = L_2/v$. The entire analysis procedure is then repeated with this new time delay value, the repeated analysis yielding an integrator output voltage proportional to $\Phi_{xx}'(\tau_2)$. Repeated measurements with different $\tau$-values yield different ordinates of the $\Phi_{xx}'(\tau)$-function. The measurement procedure can easily be carried out automatically, when the signal is recorded on a closed tape loop, whereby one $\Phi_{xx}'(\tau)$-ordinate is determined for each loop turn. Start and stop of integration and recording as well as incremental displacements of the movable head can be automatically controlled by marks on the tape as previously indicated.

According to eq. (2) calculation of $\Phi_{xy}'(\tau)$ can be carried out in a similar way as $\Phi_{xx}'(\tau)$, the only difference being that two tape tracks must be used, one track for each of the signals $x(t)$ and $y(t)$.

Correlators based on the principles outlined above, using carrier-frequency tape recording technique and rather complicated analog multipliers, are commercially available.

SUMMARY OF THE INVENTION

The apparatus according to the present invention —the characteristic features of which will appear from the appended claims —is light and cheap as compared to the above-mentioned prior art correlators.

The apparatus according to the invention will now be described with reference to FIGS. 1 to 7 of the accompanying drawings, in which:

FIG. 1, in side elevation, shows a magnetic information carrier having associated therewith a magnetic playback head with a Hall element incorporated in its magnetic circuit.

DESCRIPTION OF THE PREFERRED EMBODIMENT

Figure 1:
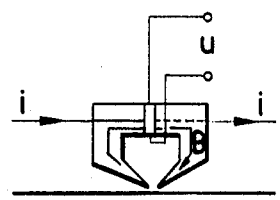
Figure 2:
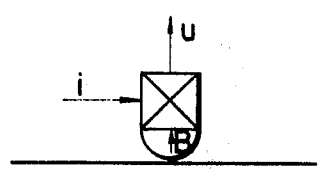
FIG. 2 illustrates a descriptive symbol used for the arrangement of FIG. 1.

A characteristic feature of the arrangement resides in the use of a ferromagnetic recording medium associated with an electromagnetic playback head having incorporated in its magnetic circuit a Hall element, as shown in FIG. 1 obviously a tape can be perpendicularly as well as longitudinally magnetized. However, if the principle according to the present invention is to be utilized down to the signal frequency zero, the tape must be perpendicularly magnetized. As is well-known, a Hall element comprises a thin wafer of semiconductor material which, when placed in a magnetic field B (moving from right to left or left to right across the top of the head of FIG. 1) and a control current $i$ is pumped through at right angles to the magnetic field (perpendicular to the paper in FIG. 1), produces a voltage $\mu$ orthogonally to the current and magnetic field, which is proportional to the product $kBi$, where $k$ depends on the Hall coefficient and on the dimensions of the wafer. Such an element, therefore, can be used for multiplying two signals. To simplify the drawings, the symbol shown in FIG. 2 will be used hereinafter for the unit shown in FIG. 1.

Figure 3:
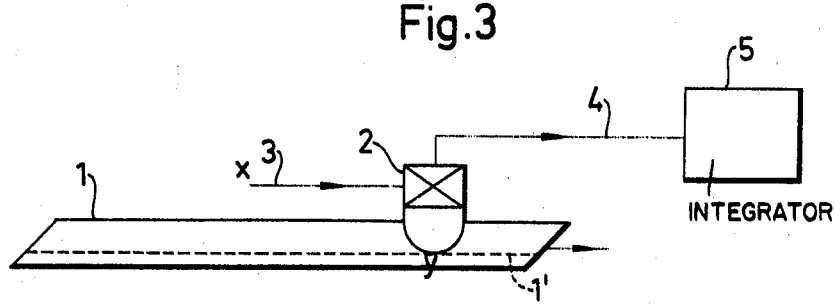
FIG. 3 shows a diagrammatic view of a first embodiment of the apparatus according to the present invention.

In the embodiment of FIG. 3, the arrangement enabling determination of one ordinate on the cross-correlation function between two electrical signals $x$ and $y$ comprises, firstly, a magnetic tape 1 being movable at a predetermined, but variable, speed and exhibiting on a track 1' a signal perpendicularly magnetized thereon, the intensity of magnetization being a function of the recording position and proportional to the signal $y$, secondly, a magnetic playback head 2 for reading off the signal $y$ and having incorporated in its magnetic circuit a Hall element carrying a control current supplied thereto through a supply conductor 3, said current having an intensity which is proportional to the signal $x$, and, thirdly, a unit 5 being supplied through a connection 4 from the output of the Hall element and serving as an average forming device (integrator) for the output signal of said Hall element over a certain time interval. The integrator may be reset to zero and the time delay increased as taught by the referenced "Computer Handbook," supra.

Figure 4:
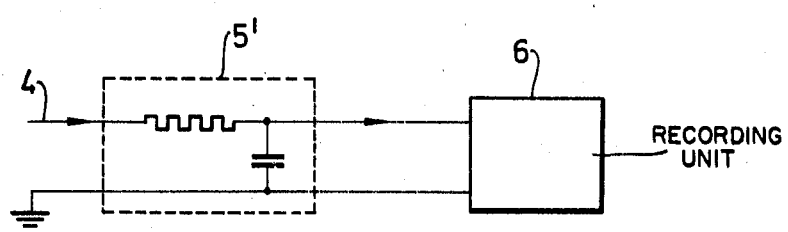
FIG. 4 shows a diagrammatic view of a first embodiment of an average forming device (or integrator).

According to FIG. 4, the average forming device consists of a low-pass filter 5' enabling instantaneous indicating or recording of the resulting cross-correlation function ordinate on an indicating or recording unit 6. This unit may be utilized for analyzing high-speed operations.

Figure 5:
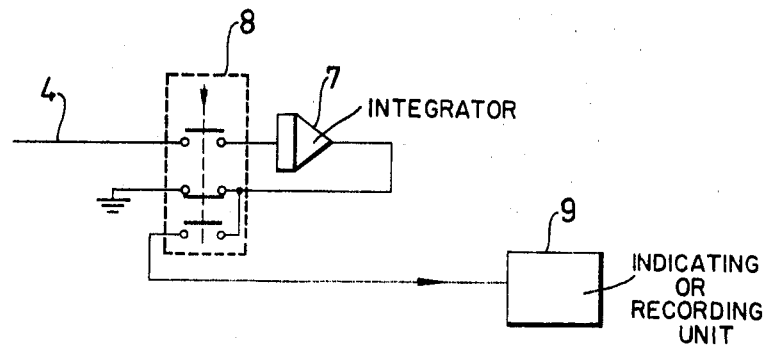
FIG. 5 shows a diagrammatic view of a second embodiment of an average forming device (or integrator).

According to FIG. 5, the average forming device comprises an integrator 7, such as an operational amplifier with a feedback capacitor, a switching contact system or control circuit 8 for resetting or zeroing the integrator, and an instrument 9 for indicating or recording the correlation result.

Figure 6:
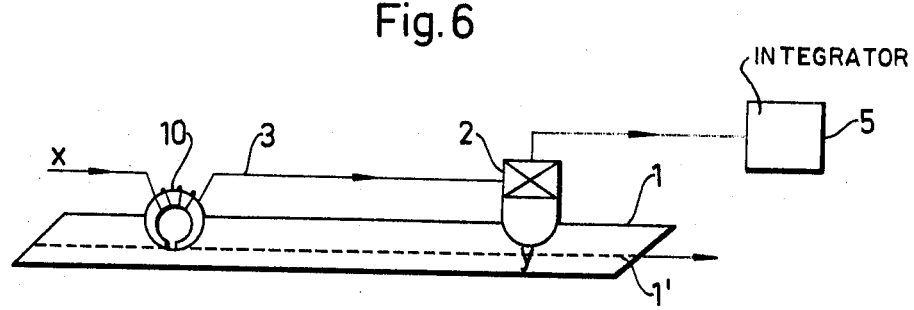
FIG. 6 shows a diagrammatic view of a second embodiment of the apparatus according to the invention.

In the embodiment of FIG. 6, the control current supplied through conductor 3 and representing the signal $x$ is passed through a magnetic head 10 which simultaneously records the signal $x$ which is then played back a moment later by the playback head 2. The distance between the two magnetic heads 2 and 10 is variable. This arrangement will produce ordinates on the autocorrelation function of the instantaneously available signal $x(t)$.

Figure 7:
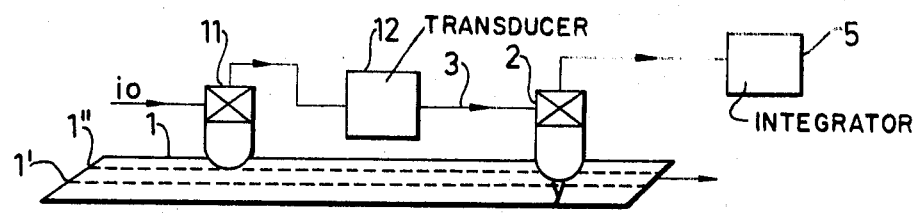
FIG. 7 shows a diagrammatic view of a third embodiment of the apparatus according to the invention.

In the embodiment of FIG. 7, the current carried by the supply conductor 3 and representing a current proportional to the signal $x$ is obtained from a transducer 12 delivering an output current proportional to the output voltage applied from a second magnetic playback head 11, which is provided with a Hall element and supplied with a constant current $I_o$, said head 11 being adapted to play back the signal recorded in a track 1'' running parallel with track 1' on the tape 1. This arrangement will give ordinates on the cross-correlation function of two signals stored on the tape.

Owing to the fact that, in the apparatus of the present invention, with multiplication is carried out by the same component which detects the recorded signal, the separate multiplier used in prior art correlators has been made superfluous. Further, the Hall element senses the instantaneous value of the magnetizing force H of the magnetic tape, whereas conventional play back heads with coils sense the time derivative $dH/dt$ of the magnetizing force. This means that slowly varying signals can be analyzed directly by means of the apparatus according to the present invention, without any preceding frequency transposition with a carrier frequency. Thus, besides the multiplier, all of the carrier-frequency equipment (oscillator, modulators, demodulators, and filters) can be dispensed with. Accordingly, the apparatus will be simple, lightweight and cheap.

I claim:

1. Apparatus for producing ordinates on the correlation function of a first and a second electrical signal, comprising the combination of a movable, ferromagnetic recording medium, having recorded thereon an information track whose intensity of magnetization is a function of the recording position and proportional to said first signal; means for moving said recording medium; an electromagnetic playback head, having incorporated in its magnetic circuit a Hall element and operatively associated with said recording medium to play back said first signal; input current supply means electrically connected to said Hall element to pass a current having an intensity proportional to said second signal through said Hall element at right angles to the magnetic field of said playback head; Hall element output means for receiving an output voltage from said Hall element, orthogonally to said magnetic field and said input current; and integrator means adapted to be triggered on and off and electrically connected to said output means for integrating the signal from said output means over a predetermined time interval, whereby the integration is started at the beginning of the analysis interval and stopped at the end of that interval.

2. Apparatus in accordance with claim 1 wherein the integrator means includes a low-pass filter and the apparatus additionally includes a display means connected to the output of said integrator means for displaying the integrator output.

3. Apparatus in accordance with claim 1 wherein the integrating means includes an amplifier with capacitor feedback and the apparatus additionally includes a control circuit for zeroing said amplifier output signal and for varying the integration period.

4. Apparatus in accordance with claim 1 wherein the first signal and the second signal are substantially the same signal, said signals are separated in time by the delay time determined of the distance between a recording head for recording said first signal and the playback head and the velocity of the ferromagnetic recording medium, and an autocorrelation function is obtained.

5. Apparatus in accordance with claim 4 wherein the input current supply means includes an electromagnetic recording head for recording the second signal on the ferromagnetic recording medium a predetermined time before the detection of said recorded signal, as the first signal, by the electromagnetic pickup head.

6. Apparatus in accordance with claim 5 wherein the distance between the playback head and the recording head is variable to vary the delay time interval.

7. Apparatus in accordance with claim 1 wherein the input current supply means includes a second electromagnetic pickup head operatively associated with the recording medium to pick up the recorded second signal and having incorporated in its magnetic circuit a second Hall element; a constant current supply means electrically connected to said second Hall element to pass a current through said second Hall element at right angles to the magnetic flux through said second pickup head; a second Hall element output means to receive a voltage from said second Hall element orthogonally to said constant current and said magnetic field in said second pickup head; and a voltage to current transducer electrically connected to the said second Hall element output.

8. Apparatus in accordance with claim 7 wherein the recording medium is movable relative to the first and second playback heads and the speed of the recording medium is variable to vary the delay time interval.

9. Apparatus in accordance with claim 7 wherein the distance between the first and second playback heads is variable to vary the delay time interval.